United States Patent
Kim

(10) Patent No.: US 11,630,699 B2
(45) Date of Patent: Apr. 18, 2023

(54) VIRTUAL PROCESS SCHEDULING AND EXECUTION USING CORES ALLOCATED VIA HOST OPERATING SYSTEM HAVING HOST READY QUEUE AND VIRTUAL READY QUEUE

(71) Applicant: Samsung Electronics Co., Ltd., Suwon-si (KR)

(72) Inventor: Hyukjoong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/784,884

(22) Filed: Feb. 7, 2020

(65) Prior Publication Data
US 2020/0257564 A1   Aug. 13, 2020

(30) Foreign Application Priority Data
Feb. 8, 2019   (KR) .......... 10-2019-0015145

(51) Int. Cl.
*G06F 9/50*   (2006.01)
*G06F 9/455*   (2018.01)
*G06F 9/48*   (2006.01)

(52) U.S. Cl.
CPC ........ *G06F 9/5027* (2013.01); *G06F 9/45558* (2013.01); *G06F 9/4881* (2013.01); *G06F 9/5077* (2013.01); *G06F 9/4887* (2013.01); *G06F 2009/45575* (2013.01); *G06F 2209/486* (2013.01)

(58) Field of Classification Search
CPC .. G06F 9/5027; G06F 9/45558; G06F 9/5077; G06F 9/4881; G06F 2209/486; G06F 9/4887; G06F 2009/45575
See application file for complete search history.

(56) References Cited

U.S. PATENT DOCUMENTS

| | | | |
|---|---|---|---|
| 8,424,007 B1 * | 4/2013 | Hernacki | G06F 9/4881 718/103 |
| 8,677,449 B1 * | 3/2014 | Beda, III | G06F 21/53 726/1 |
| 10,545,778 B1 * | 1/2020 | Venkata | G06F 9/45558 |
| 2007/0169127 A1 * | 7/2007 | Kashyap | G06F 9/5077 718/104 |
| 2009/0025006 A1 | 1/2009 | Waldspurger | |
| 2009/0037911 A1 | 2/2009 | Ahuja et al. | |

(Continued)

OTHER PUBLICATIONS

Https://techterms.com/definition/processor_core (Year: 2015).*

(Continued)

*Primary Examiner* — Michael W Ayers
(74) *Attorney, Agent, or Firm* — Jefferson IP Law, LLP

(57) ABSTRACT

An electronic device and storage medium for process scheduling are provided. The electronic device includes a memory and at least one processor, wherein the memory stores instructions to enable the at least one processor to execute a host operating system (OS) and at least one virtual machine, and wherein the host OS is configured to receive information for at least one process from the virtual machine, allocate at least one core to the virtual machine based on the information for the at least one process, and provide, to the virtual machine, information related to allocation of the at least one core. Other various embodiments are possible as well.

13 Claims, 13 Drawing Sheets

(56) References Cited

U.S. PATENT DOCUMENTS

| | | | |
|---|---|---|---|
| 2009/0089780 A1* | 4/2009 | Johnson | G06F 9/5077 |
| | | | 718/1 |
| 2010/0138829 A1* | 6/2010 | Hanquez | G06F 9/5077 |
| | | | 718/1 |
| 2012/0233477 A1 | 9/2012 | Wu et al. | |
| 2012/0317568 A1 | 12/2012 | Aasheim | |
| 2014/0325511 A1 | 10/2014 | Aasheim | |
| 2015/0100959 A1* | 4/2015 | Kruglick | G06F 9/5077 |
| | | | 718/1 |
| 2015/0363218 A1* | 12/2015 | Heyrman | G06F 9/45558 |
| | | | 718/1 |
| 2016/0170474 A1 | 6/2016 | Takemura | |
| 2017/0031697 A1* | 2/2017 | Lee | G06F 3/04812 |
| 2018/0095880 A1 | 4/2018 | Doshi et al. | |
| 2018/0173553 A1 | 6/2018 | Warkentin et al. | |
| 2019/0361749 A1* | 11/2019 | Tsirkin | G06F 9/45558 |

OTHER PUBLICATIONS

International Search Report and Written Opinion dated May 18, 2020, issued in International Patent Application No. PCT/KR2020/001781.

Alexandra Fedorova et al., Cypress: A Scheduling Infrastructure for a Many-Core Hypervisor, 2008.

Youngjin Kwon et al., Virtualizing Performance Asymmetric Multi-core Systems, 2011.

Francisco Romero et al., Mage: Online and Interference-Aware Scheduling for Multi-Scale Heterogeneous Systems, Apr. 17, 2018.

Vahid Kazempour et al., AASH: An Asymmetry-Aware Scheduler for Hypervisors, Jul. 1, 2010.

Hwanju Kim et al., Task-aware Virtual Machine Scheduling for I/O Performance, 2010.

K. T. Raghavendra et al., Paravirtualization for scalable Kernel-based Virtual Machine (KVM), Oct. 1, 2012.

* cited by examiner

VIRTUAL PROCESS SCHEDULING AND EXECUTION USING CORES ALLOCATED VIA HOST OPERATING SYSTEM HAVING HOST READY QUEUE AND VIRTUAL READY QUEUE

CROSS-REFERENCE TO RELATED APPLICATION(S)

This application is based on and claims priority under 35 U.S.C. § 119(a) of a Korean patent application number 10-2019-0015145, filed on Feb. 8, 2019, in the Korean Intellectual Property Office, the disclosure of which is incorporated by reference herein in its entirety.

BACKGROUND

1. Field

The disclosure relates to electronic devices, storage media, and methods for process scheduling in an asymmetric multi-core processor environment.

2. Description of Related Art

Processors for electronic devices in the embedded system environment are evolving to multi-core processors to deliver enhanced performance. Multi-core processors are divided largely into symmetric multi-core processors and asymmetric multi-core processors. Asymmetric multi-core processors (AMPs) give better performance and high efficiency over symmetric multi-core processors. Thus, use of AMPs is soaring.

An AMP embeds multiple cores, e.g., four, eight, or 16 cores, in a single chip. An AMP may include multiple cores with different properties, e.g., some with higher performance but lower energy efficiency (e.g., big cores) and others with lower performance but higher energy efficiency (e.g., little cores).

The AMP may perform process scheduling to allocate the cores to processes to be executed, considering the performance of each core.

In the asymmetric multi-core environment, electronic devices may support a virtual operating system (OS) (e.g., a virtual machine) by adopting virtualization technology for efficient use of hardware resources.

In electronic devices in the asymmetric multi-core environment of the related art, the virtual OS regards virtual resources (e.g., virtual central processing units (vCPUs)) as black boxes and performs process scheduling. The virtual OS is unaware of the asymmetricity of the physical hardware and performs scheduling in order of priority of process.

Thus, the host OS is not given information about the process running on the virtual OS. Resultantly, many of the cores remain inactive or duplicate process scheduling may be performed. As such, in the asymmetric multi-core environment of the related art, electronic devices suffer from inefficient use of cores and a lowering in performance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device, storage medium, and method for process scheduling which enables allocation of a process to cores in an efficient manner using virtualization technology.

Additional aspects will be set forth in part in the description which follows and, in part, will be apparent from the description, or may be learned by practice of the presented embodiments.

In accordance with an aspect of the disclosure, an electronic device is provided. The electronic device includes a memory and at least one processor, wherein the memory stores instructions to enable the at least one processor to execute a host operating system (OS) and at least one virtual machine, and wherein the host OS is configured to receive information for at least one process from the virtual machine, allocate at least one core to the virtual machine based on the information for the at least one process, and provide, to the virtual machine, information related to allocation of the at least one core.

In accordance with another aspect of the disclosure, an electronic device is provided. The electronic device includes a memory and at least one processor, wherein the memory stores instructions to enable the at least one processor to execute a host operating system (OS) and at least one virtual machine, and wherein the host OS is configured to receive information for at least one process from the virtual machine, allocate at least one core to at least one virtual resource identified based on the information for the at least one process, and provide, to the virtual machine, information related to allocation of the at least one core.

In accordance with yet another aspect of the disclosure, a non-transitory computer readable recording medium is provided. The non-transitory computer readable recording medium includes recording a program running on a computer, the program including executable instructions configured to, when executed by a processor, enable the processor to execute a host OS and at least one virtual machine, the executable instructions enabling the host OS to receive information for at least one process from the virtual machine, allocate at least one core to the virtual machine based on the information for the at least one process, and provide, to the virtual machine, information related to allocation of the at least one core.

In accordance with yet another aspect of the disclosure, a computer readable recording medium is provided. The computer readable recording medium includes recording a program running on a computer, the program including executable instructions configured to, when executed by a processor, enable the processor to execute a host OS and at least one virtual machine, the executable instructions enabling the host OS to receive information for at least one process from the virtual machine, allocate at least one core to at least one virtual resource identified based on the information for the at least one process, and provide, to the virtual machine, information related to allocation of the at least one core.

In accordance with yet another aspect of the disclosure, a method for process scheduling on an electronic device is provided. The method includes receiving, by a host OS executed by at least one processor of the electronic device, information for at least one process from a virtual machine executed by the processor, allocating, by the host OS, at least one core to the virtual machine based on the information for the at least one process, providing, by the host OS, information related to allocation of the at least one core to the virtual machine, and running, by the virtual machine, the at least one process based on the information related to allocation of the at least one core.

In accordance with yet another aspect of the disclosure, a method for process scheduling on an electronic device is provided. The method includes receiving, by a host OS executed by at least one processor of the electronic device, information for at least one process from a virtual machine executed by the processor, allocating, by the host OS, at least one core to at least one virtual resource identified based on the information for the at least one process, providing, by the host OS, information related to allocation of the at least one core to the virtual machine, identifying, by the virtual machine, the at least one virtual resource reallocated based on the information related to allocation of the at least one core, selecting at least one process by the virtual machine, allocating, by the virtual machine, the at least one virtual resource to the selected at least one process, and running, by the virtual machine, the selected at least one process, using the at least one virtual resource allocated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
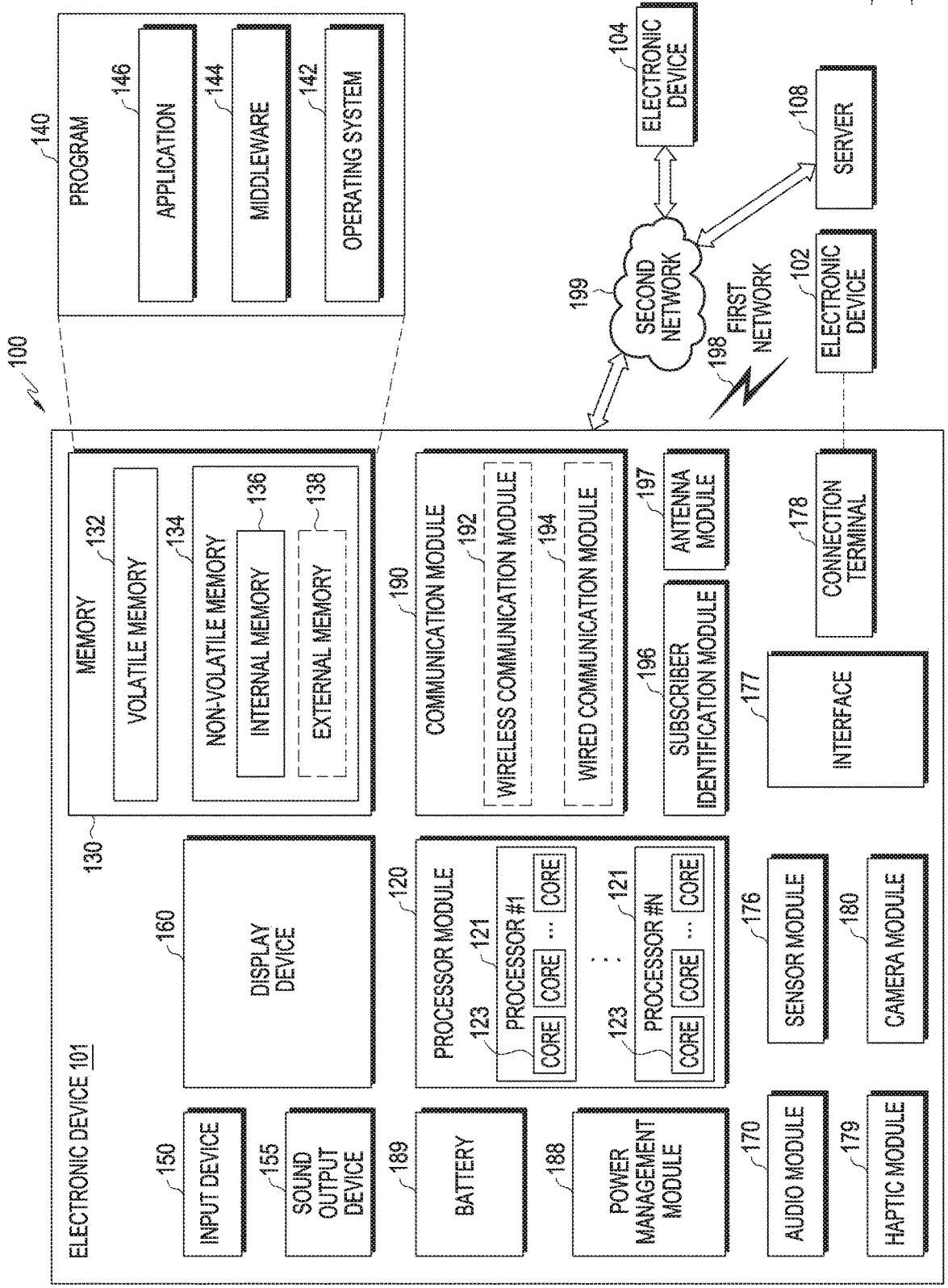
FIG. 1 is a view illustrating a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor module 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor module 120 may include at least one processor 121 (#1, . . . , # N). The at least one processor 121 may execute, e.g., software (e.g., a program 140) to control at least one other component (e.g., a hardware or software component) of the electronic device 101 connected with the processor 121 and may process or compute various data. The processor 121 may include at least one core 123. According to one embodiment, as at least part of the data processing or computation, the processor 121 may load a command or data received from another component (e.g., the sensor module 176 or the communication module 190) in volatile memory 132, process the command or the data stored in the volatile memory 132, and store resulting data in non-volatile memory 134.

The memory 130 may store various data used by at least one component (e.g., the at least one processor 121, the at least one core 123 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the at least one processor 121 or the at least one core 123) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone)) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 121 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Described below with reference to the accompanying drawings is an electronic device for performing process scheduling by semi-virtualizing process scheduling based on the first electronic device 101 of FIG. 1, according to an embodiment.

As used below, the term "process" may mean a processing unit of scheduling as a task executed by at least one processor. The term "process" may be interchangeably used with the term "task" or "thread" depending on the type of operating system (OS). Without being limited thereto, the processing unit of scheduling may be defined in other terms. The terms as used herein are those readily appreciated and commonly used by one of ordinary skill in the art.

Figure 2:
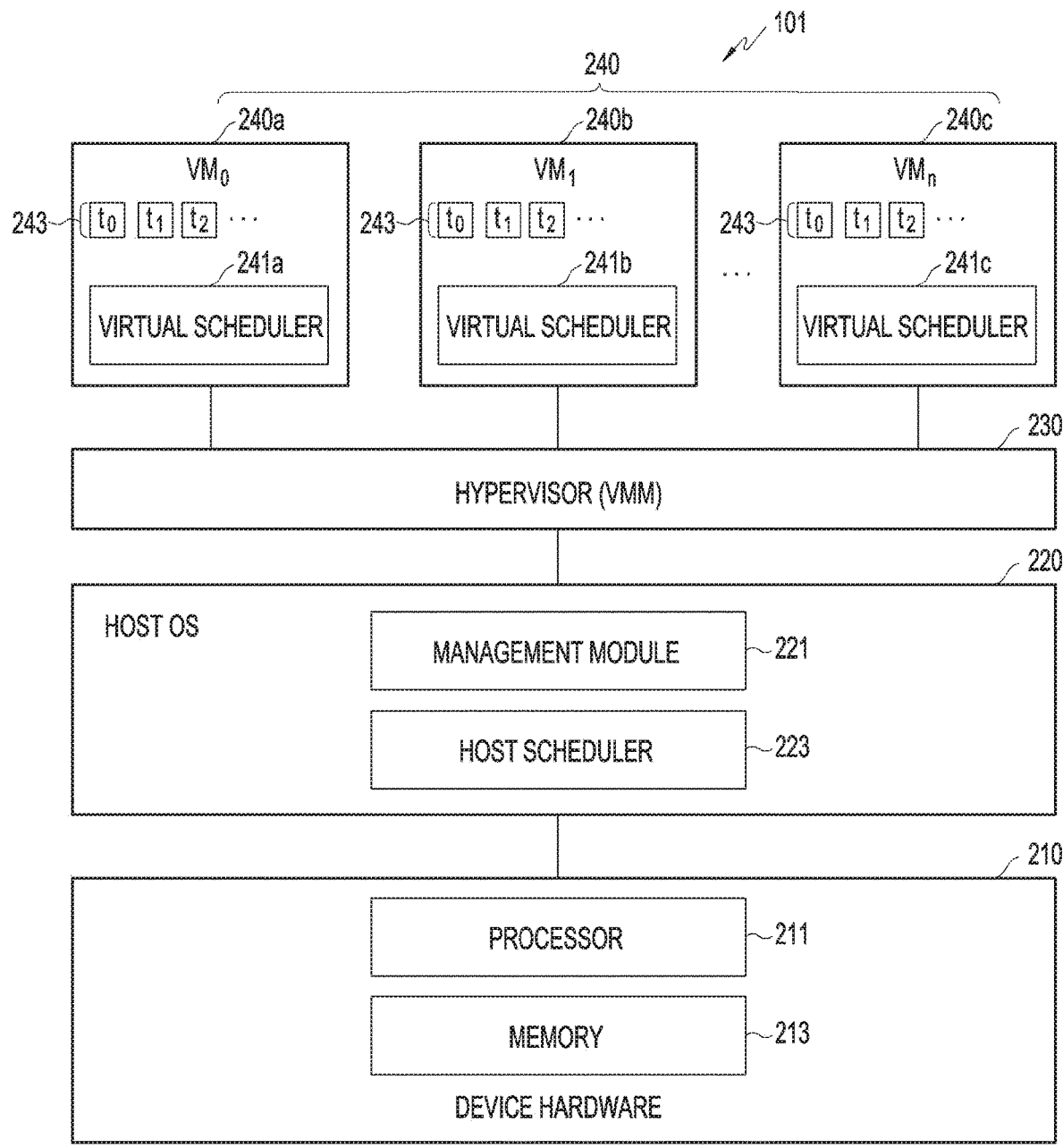
FIG. 2 is a view illustrating an example configuration of an electronic device according to an embodiment of the disclosure.

FIG. 2 is a view illustrating an example configuration of an electronic device according to an embodiment of the disclosure.

Referring to FIG. 2, according to an embodiment, an electronic device 101 (which is identical or similar to the first electronic device 101 of FIG. 1) may be configured as device hardware 210 including at least one processor 211 and a memory 213.

According to an embodiment, the at least one processor 211 (e.g., the processor 121 of FIG. 1) may include at least one core (e.g., the core 123 of FIG. 1), a cache memory (not shown), and/or a controller (not shown). Each processor 211 may be an asymmetric multi-core processor, but is not necessarily limited thereto. The core may be a hardware computation device that processes one instruction at a time. The cores included in each processor 211 may be multiple cores asymmetric to each other, but not limited thereto.

According to an embodiment, the memory 213 (e.g., the memory 130 of FIG. 1) may store a software program (which is identical or similar to the program 140 of FIG. 1) for process scheduling, which may include a host operating system (OS) 220 (e.g., the OS 142 of FIG. 1), a hypervisor 230, and at least one virtual machine (VM) 240, 240a, 240b, and 240c. The memory 213 may store instructions to enable the at least one processor 211 to execute the host OS 220, the hypervisor 230, and the at least one virtual machine 240.

According to an embodiment, the host OS 220 may be software (e.g., Windows, Linux, MAC, iOS, or Android) installed on a higher level than the at least one processor 211 (e.g., the asymmetric multi-core processor) while interworking with the device hardware 210. The host OS 220 may be configured to receive information for at least one process managed by the virtual machine 240 (this information is hereinafter referred to as 'process information') from the virtual machine 240, allocate at least one core (e.g., the core 123 of FIG. 1) to the virtual machine 240 based on the information for the at least one process, and provide, to the virtual machine 240, information related to allocation of the at least one core allocated, (this information is hereinafter referred to as 'allocation information'). The host OS 220 may include a management module 221 and a host scheduler 223. According to an embodiment, the management module 221 may receive information for the at least one process shared by the virtual machine 240 and may manage the shared information for the at least one process. The information for the at least one process is managed by the virtual scheduler 241a, 241b, or 241c of the virtual machine 240. According to an embodiment, the host scheduler 223 may identify at least one process to be run on the virtual machine 240 or at least one virtual resource (e.g., a virtual central processing unit (vCPU)) available to the virtual machine 240 based on the information for the at least one process and perform scheduling to allocate the at least one core to the at least one process or the at least one virtual resource (vCPU).

According to an embodiment, the hypervisor 230 may be software placed on a higher layer than the host OS 220 to monitor the at least one virtual machine 240. For example, the hypervisor 230 may correspond to a virtual machine monitor (VMM) or quick emulator (QEMU). The hypervisor may perform management to individually run the OS on the at least one virtual machine 240 and may receive instructions via, e.g., hypercall, from the at least one virtual machine 240. According to an embodiment, the hypervisor 230 may provide the host OS 220 with relevant information to allow the host OS 220 to share at least one, or allocated, virtual resource for the at least one virtual machine 240.

According to an embodiment, the at least one virtual machine 240 may be software that is run via the hypervisor and may individually run the OS. The virtual machine 240 may correspond to a guest OS. The guest OS may be configured to run at least one application on the virtual machine 240. The at least one virtual machine 240 may include a virtual scheduler 241a, 241b, or 241c that schedules at least one process 243 (t0, t1, and t2) related to execution of the application.

Figure 3A:
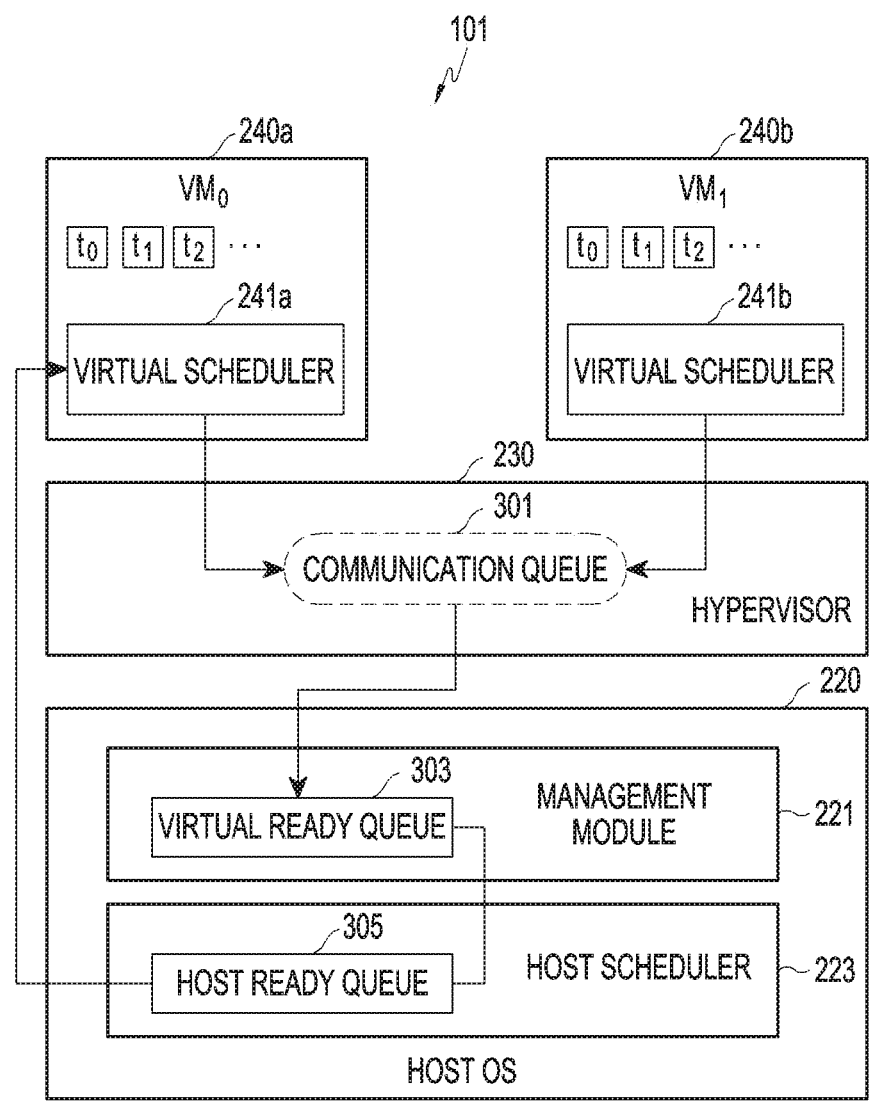
FIGS. 3A and 3B are views illustrating an example configuration of an electronic device according to an embodiment of the disclosure.

FIG. 3A is a view illustrating an example configuration of an electronic device according to an embodiment of the disclosure.

Referring to FIG. 3A, according to an embodiment, the host OS 220 may be configured to allow the host OS 220 to share and manage process information which is managed by the virtual machines 240a and 240b, using the management module 221. The host OS 220 may share information related to a scheduling policy including the priority for process scheduling and the process information of the at least one virtual machine 240a and 240b and a virtual runtime indicating the time during which the process runs.

The virtual schedulers 241a and 241b respectively included in the virtual machines 240a and 240b, when a new process is generated, may identify the generated process and transmit process information for the identified process to the hypervisor 230 so that the host OS 220 may share the process information. According to an embodiment, whenever identifying generation of a new process, the virtual schedulers 241a and 241b may provide process information for the new process to the management module 221 of the host OS 220 directly or via the hypervisor 230. According to an embodiment, in a predetermined time period or when scheduling begins, the virtual scheduler 241a or 241b may provide all or at least part of the process information it is managing to the management module 221 directly or via the hypervisor 230 so as to share the process information with the host OS 220.

The virtual schedulers 241a and 241b may receive information (hereinafter, referred to as allocation information) related to the core allocated to at least one process selected according to scheduling by the host scheduler 223. Upon receiving the allocation information, the virtual schedulers 241a and 241b may identify at least one process to run based on the allocation information and transfer a signal containing the allocation information to the virtual machine 240 corresponding to the at least one process identified. The virtual machine 240 may be configured to change the at least one process identified to a running state and then run the at least one process identified, using the core allocated to the at least one process identified.

The hypervisor 230 may insert the process information received from each of the virtual machines 240a and 240b into a communication queue 301. The hypervisor 230 may transmit the process information inserted into the communication queue 301 to the host OS 220. According to an embodiment, the hypervisor 230 may be configured without the communication queue 301.

The management module 221 of the host OS 220 may be configured with a virtual ready queue 303 but, without limitations, the management module 221 may be configured without the virtual ready queue 303. According to an embodiment, the management module 221 may insert the process information received via the hypervisor 230 into the virtual ready queue 303. According to an embodiment, if the virtual ready queue 303 is omitted, the management module 221 may insert the received process information into the host ready queue 305. According to an embodiment, the management module 221 may perform management to insert the process information inserted into the virtual ready queue 303 into the host ready queue 305. For example, if the host scheduler 223 may select only the process inserted into the host ready queue 305, the management module 221 may insert all or at least some of the processes inserted into the virtual ready queue 303 into the host ready queue 305.

The management module 221 may receive process information from the virtual machine 240a and/or 240b via the hypervisor 230, manage the received process information, and identify the order of priority of the at least one process per virtual machine 240a and 240b. According to an embodiment, the management module 221 may determine and manage the order of priority for at least one process directly based on the scheduling policy. According to an embodiment, the management module 221 may previously identify the order of priority for at least one process based on the received process information and, when the host scheduler 223 performs process scheduling, perform management to provide the identified order of priority to the host scheduler 223. According to an embodiment, the management module 221 may determine and manage the order of priority based on additional information identified by the hypervisor 230 and the scheduling policy or perform management to provide the additional information to the host scheduler 223. For example, the additional information may include billing information or unique properties for the virtual machines 240a and 240b.

The host scheduler 223 may include the host ready queue 305. The host ready queue 305 may be a storage area of a separate local memory for the memory (which is identical or similar to the volatile memory 132 of FIG. 1 or the memory 213 of FIG. 2) of the electronic device 101.

The host scheduler 223 may allocate the at least one selected process (e.g., a virtual process or host process) to the core. The host scheduler 223 may schedule the virtual process, which is an asymmetric, based on the process information for the virtual machine 240 managed by the management module 221, as well as the process (e.g., a host process) running on the host OS 220.

The host scheduler 223 may select at least one process based on the process information inserted into the virtual ready queue 303 and/or the host ready queue 305. If the selected at least one process is a virtual process, allocation information may be transmitted via, e.g., a virtual interrupt (vIRQ), to the virtual machine (e.g., the first virtual machine 240a) corresponding to the process, but not necessarily limited thereto. According to an embodiment, the host scheduler 223 may transmit the allocation information to the hypervisor 230. According to an embodiment, the host scheduler 223 may select at least one process using a policy, such as, e.g., virtual runtime or token, among predetermined scheduling policies.

According to an embodiment, the host scheduler 223 may insert a process running on a physical CPU (hereinafter, a host process) into the host ready queue 305. The host scheduler 223 may access the virtual ready queue 303. The host scheduler 223, when a process scheduling event occurs, may select at least one from among the processes (e.g., virtual processes) inserted into the virtual ready queue 303 and the processes (e.g., host processes) inserted into the host ready queue 305. The host scheduler 223 may allocate the at least one selected process to the core. Upon selecting the process, the host scheduler 223 may determine order of priority for the virtual processes and the host processes based on information related to order of priority provided from the management module 221 (e.g., order-of-priority information determined by the management module 221, order-of-priority information by the scheduling policy, or order-of-priority information by the scheduling policy and additional information).

According to an embodiment, when the virtual ready queue 303 is omitted, the host scheduler 223 may select at least one process from among the processes (e.g., the virtual processes and the host processes) inserted into the host ready queue 305.

According to an embodiment, if all or at least some of the processes inserted into the virtual ready queue 303 are inserted into the host ready queue 305, the host scheduler 223 may select at least one process from among the processes (e.g., the virtual processes and host processes) inserted into the host ready queue 305.

Figure 3B:
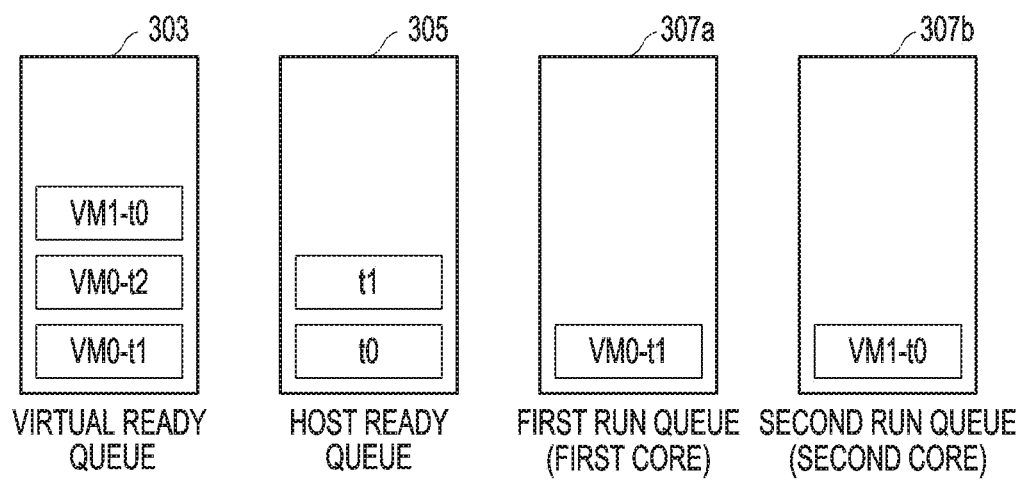

FIG. 3B is a view illustrating an example configuration of an electronic device according to an embodiment of the disclosure.

Referring to FIG. 3B, an example in which the host OS 220 performs process scheduling using the virtual ready queue 303, the host ready queue 305, and a first and second run queue 307a and 307b individually corresponding to cores (e.g., the processor 123 of FIG. 1) is described below.

Referring to FIGS. 3A and 3B, the management module 221 may insert process information for each of the virtual processes (e.g., a first virtual process VM0-t1 and a second virtual process VM0-t2) of the first virtual machine 240a and the virtual process (e.g., a third virtual process VM1-t0) of the second virtual machine 240b into the virtual ready queue 303 and manage them. The host scheduler 223 may insert the process information for each of the host processes t0 and t1 into the host ready queue 305. The first virtual process (e.g., VM0-t1) and the third virtual process (e.g., VM1-t0) may have higher priorities than the second virtual process VM0-t2 and the host processes t0 and t1.

Upon performing scheduling, the host scheduler 223 may select the first and third virtual processes VM0-t1 and VM140 with higher priorities based on the process information inserted into the virtual ready queue 303 and the process information inserted into the host ready queue 305 and allocate the selected first and third virtual processes VM0-t1 and VM140 to the first core and the second core, respectively. The host scheduler 223 may insert the process information for the first virtual process VM0-t1 into a first run queue 307a corresponding to the allocated first core and insert the process information for the third virtual process VM140 into a second run queue 307b corresponding to the second core. The host scheduler 223 may transmit the allocation information for the first virtual process (e.g., VM0-t1) to the first virtual machine 240a and transmit the allocation information for the third virtual process (e.g., VM140) to the second virtual machine 240b. The first core and the second core are physical cores included in at least one processor (e.g., the processor 121 of FIG. 1 or the processor 211 of FIG. 2). The first run queue 307a and the second run queue 307b may be a partial storage area of a separate local memory for the memory (which is identical or similar to the volatile memory 132 of FIG. 1 or the memory 213 of FIG. 2) of the electronic device 101.

The first virtual machine 240a may be configured to identify the first virtual process VM0-t1 based on the received allocation information, change the first virtual process VM0-t1 to a running state and, if a running time arrives, run the first virtual process VM0-t1 using the first core corresponding to the first run queue 307a into which the first virtual process VM0-t1 has been inserted.

The second virtual machine 240b may be configured to change the first virtual process VM0-t1 identified based on the received allocation information to the running state and, if a running time arrives, run the first virtual process VM0-t1 using the first core corresponding to the first run queue 307a into which the first virtual process VM0-t1 has been inserted.

The main components of the electronic device have been described above based on the electronic device 101 of FIG. 2 (or FIG. 3A). According to an embodiment, however, all of the components of FIG. 2 (or FIG. 3A) are not essential components, and the electronic device 101 may be implemented with more or less components than those shown. The position of the main components described above in connection with FIG. 2 (or FIG. 3A) may be varied according to various embodiments of the disclosure.

According to an embodiment, an electronic device comprises a memory and at least one processor. The memory stores instructions to enable the at least one processor to execute a host operating system (OS) and at least one virtual machine, and wherein the host OS is configured to receive information for at least one process from the virtual machine, allocate at least one core to the virtual machine based on the information for the at least one process, and provide, to the virtual machine, information related to allocation of the at least one core.

According to an embodiment, the host OS may be configured to, select at least one process to be run on the virtual machine based on the information for the at least one process, and information related to a scheduling policy shared by the virtual machine and allocate the at least one core to the selected at least one process.

According to an embodiment, the electronic device may further comprise a hypervisor configured to provide the information for the at least one process received from the virtual machine to the host OS.

According to an embodiment, the host OS may include a management module configured to receive the information for the at least one process shared by a virtual scheduler of the virtual machine and manage the information for the at least one process and a host scheduler configured to select at least one process to be run on the virtual machine based on the information for the at least one process and perform scheduling to allocate the at least one core to the selected at least one process.

According to an embodiment, the management module may be configured to receive information related to a scheduling policy shared by the virtual machine and manage the scheduling policy-related information, wherein the scheduling policy-related information includes an order of priority and a virtual runtime indicating a time during which a process is run.

According to an embodiment, the host scheduler may be configured to, when an event for the scheduling occurs, select at least one of at least one other process run on the host OS and at least one process to be run on the virtual machine.

According to an embodiment, the host scheduler may be configured to, when the event for the scheduling occurs, select the at least one process to be run on the virtual machine and further select at least one other process to be run on the host OS while interworking with the selected at least one process.

According to an embodiment, the virtual machine may be configured to identify at least one process to be run based on the information related to allocation of the at least one core provided from the host OS and run the at least one process identified.

According to an embodiment, an electronic device comprises a memory and at least one processor. The memory stores instructions to enable the at least one processor to execute a host operating system (OS) and at least one virtual machine, and wherein the host OS is configured to receive information for at least one process from the virtual machine, allocate at least one core to at least one virtual resource identified based on the information for the at least one process, and provide, to the virtual machine, information related to allocation of the at least one core.

According to an embodiment, the host OS may include a management module configured to receive the information for the at least one process shared by a virtual scheduler of the virtual machine and manage the information for the at least one process and a host scheduler configured to identify the at least one virtual resource available on the virtual machine based on the information for the at least one process and perform scheduling to allocate the at least one core to the at least one virtual resource.

According to an embodiment, the electronic device may further comprise a hypervisor configured to provide the information for the at least one process to the host OS and reallocate the at least one virtual resource to the virtual machine based on the information related to allocation of the at least one core provided from the host OS.

According to an embodiment, the virtual machine may be configured to identify the at least one virtual resource reallocated by the hypervisor, select at least one process, allocate the at least one virtual resource to the selected at least one process, and run the selected at least one process.

Operations of the electronic device as described above are described below in detail with reference to the accompanying drawings.

Figure 4:
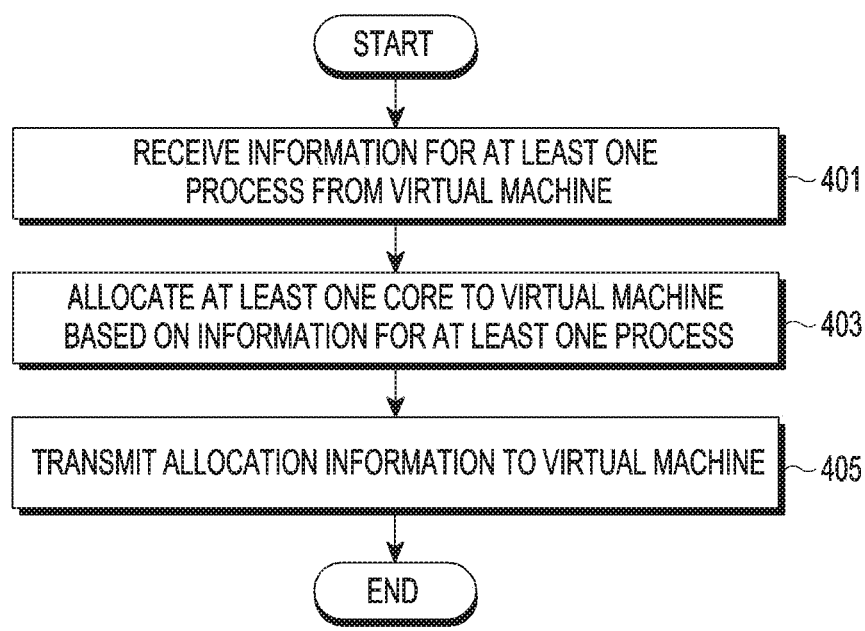
FIG. 4 is a flowchart illustrating operations of an electronic device according to an embodiment of the disclosure.

FIG. 4 is a flowchart illustrating operations of an electronic device according to an embodiment of the disclosure.

Referring to FIG. 4, according to an embodiment, an electronic device (e.g., the first electronic device 101 of FIG. 1 or the electronic device 101 of FIG. 2) may execute at least one virtual machine (e.g., the virtual machine 240 of FIG. 2) and a host OS (e.g., the host OS 220 of FIG. 2 or 3A) by at least one processor (e.g., the processor 121 of FIG. 1 or the processor 211 of FIG. 2). The host OS may share process information for at least one process running on the virtual machine and manage the process information.

Referring to FIG. 4, in operation 401, the host OS running on the electronic device may receive information for the at least one process (hereinafter, process information) from the virtual machine. The host OS may insert the process information received from the virtual machine into a virtual ready queue (e.g., the virtual ready queue 303 of FIG. 3A) and manage the process information until a scheduling chance is given. According to an embodiment, the host OS may receive the process information using a communication queue (e.g., the communication queue 301 of FIG. 3A) of a hypervisor (e.g., the hypervisor 230 of FIG. 2 or 3A).

In operation 403, the host OS may allocate at least one core to the virtual machine based on the at least one process. In operation 403, upon performing scheduling, the host OS may select at least one from among processes of the host or at least one process (virtual processes) inserted into the virtual ready queue. The host OS may allocate a core to the selected at least one process.

In operation 405, the host OS may provide, to the virtual machine, information related to allocation of the at least one core (hereinafter, allocation information). According to an embodiment, if the at least one process selected is a virtual process, the host OS may transmit the allocation information to the virtual machine directly or via a hypervisor.

Upon receiving the allocation information from the host OS, the virtual machine may identify at least one process to run based on the allocation information and run the at least one process identified, using the core allocated to the at least one process identified.

Figure 5:
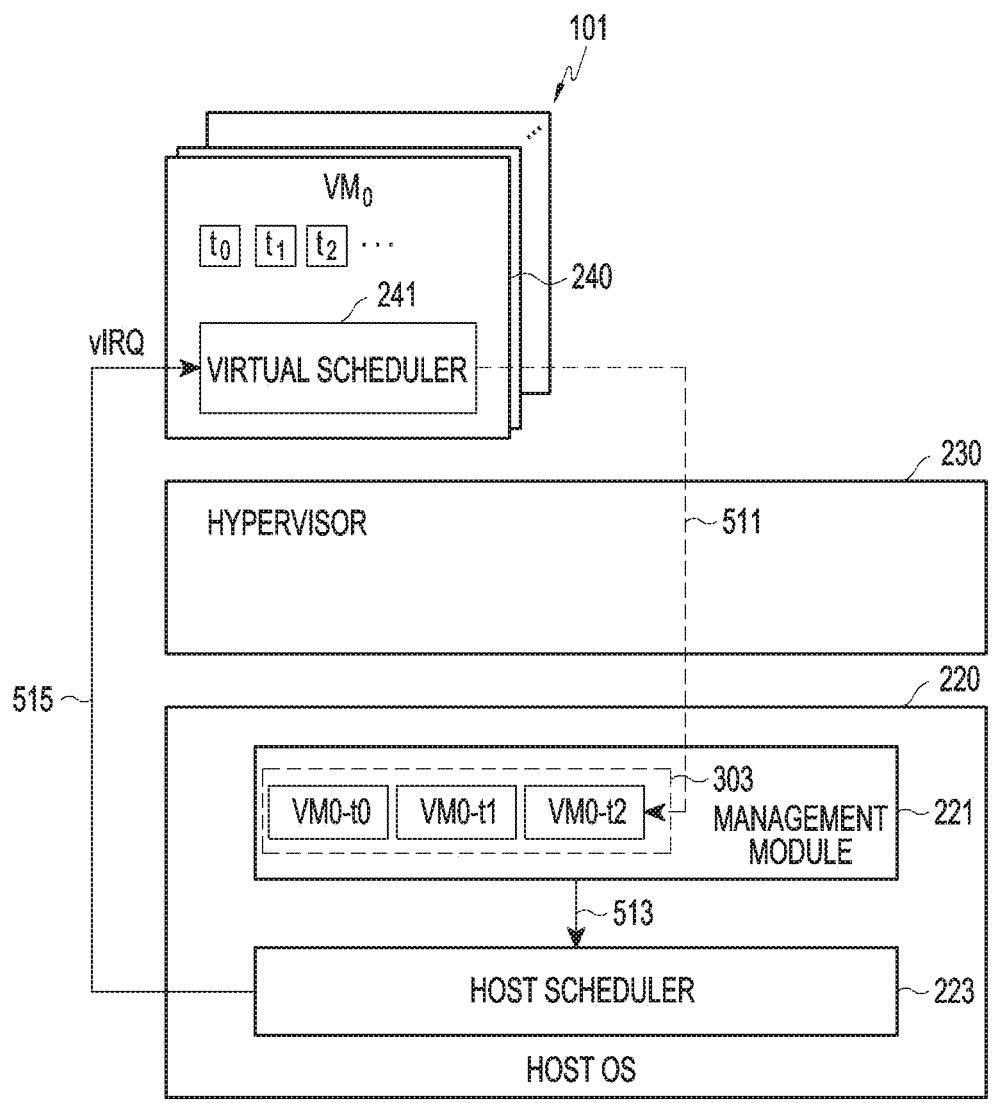
FIG. 5 is a view illustrating operations of an electronic device according to an embodiment of the disclosure.

FIG. 5 is a view illustrating operations of an electronic device according to an embodiment of the disclosure.

Figure 6:
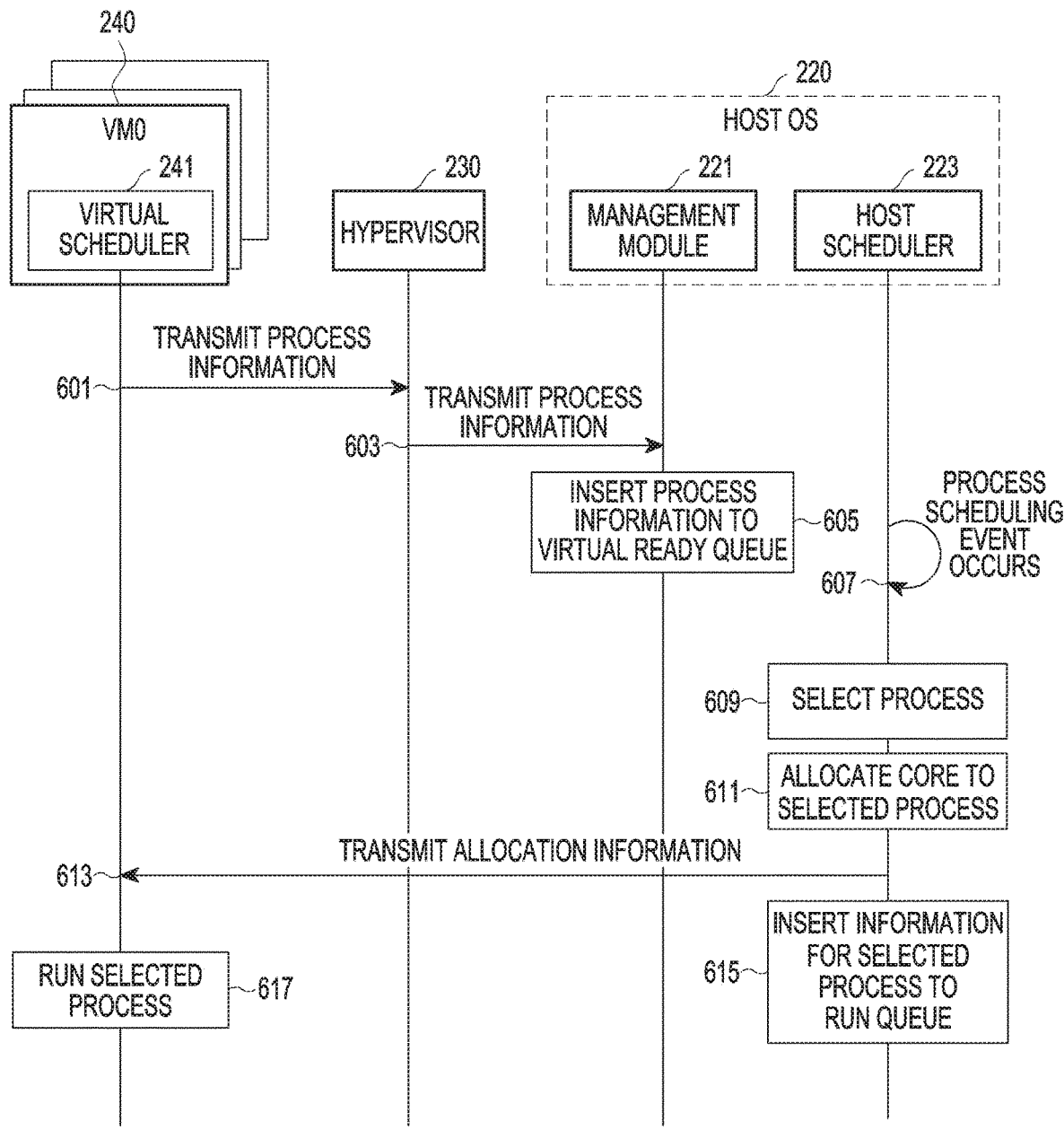
FIG. 6 is a flowchart illustrating operations of an electronic device according to an embodiment of the disclosure.

FIG. 6 is a flowchart illustrating operations of an electronic device according to an embodiment of the disclosure.

Referring to FIGS. 5 and 6, specific operations are described below and based on the scheduling operation of FIG. 4.

Referring to FIGS. 5 and 6, in operations 601 and 603 (identical to operation 511 of FIG. 5), according to an embodiment, at least one virtual machine 240 executed on an electronic device (e.g., the first electronic device 101 of FIG. 1 or the electronic device 101 of FIG. 2), when a new process is generated, may provide process information for the new process via the virtual scheduler 241 to the management module 221 to share the new process with the host OS 220. According to an embodiment, the virtual machine 240 may provide the process information to the management module 221 of the host OS 220 via the hypervisor 230. The hypervisor 230 may insert the process information received by the virtual machine 240 to the communication queue 301 and transmit the process information inserted into the communication queue 301 into the management module 221. According to an embodiment, the hypervisor 230 may omit the communication queue 301. According to an embodiment, the virtual machine 240 may directly transmit the process information to the management module 221. According to an embodiment, upon identifying generation of a new process, in a predetermined time period, or whenever scheduling begins, the virtual scheduler 241 of the virtual machine 240 may provide process information for the new process or process information for the process not shared with the host OS 220.

In operation 605, the management module 221 of the host OS 220 may manage the process information provided from the virtual machine 240. According to an embodiment, the host OS 220 may insert at least one piece of process information received into the virtual ready queue 303. The management module 221 may identify order of priority for at least one process per virtual machine 240. The management module 221 may wait for next process scheduling based on the identified order of priority. The management module 221 may insert all or at least some of processes scheduled by the virtual machine 240 into the virtual ready queue 303.

In operation 607, the host scheduler 223 may identify an occurrence of a process scheduling event.

In operation 609 (or operation 513 of FIG. 5), the host scheduler 223 of the host OS 220, when the process scheduling event occurs, may select at least one process based on the process information inserted into the virtual ready queue 303 and the process information inserted into the host ready queue 305. The host scheduler 223 may identify the order of priority of virtual processes and host processes based on a predesignated scheduling policy and select at least one process based on the identified order of priority. If a plurality of processes is selected, the selected processes all may correspond to a single virtual machine, or some of the selected processes may correspond to another virtual machine. According to an embodiment, upon selecting the process, the host scheduler 223 may determine order of priority for the virtual processes and the host processes based on information related to order of priority provided from the management module 221 (e.g., order-of-priority information determined by the management module 221, order-of-priority information by the scheduling policy, or order-of-priority information by the scheduling policy and additional information). According to an embodiment, the host scheduler 223 may select at least one process using a policy, such as, e.g., virtual runtime or token, among predetermined scheduling policies.

In operation 611, the host scheduler 223 may allocate a core to the selected at least one process. In other words, the host scheduler 223 may allocate at least one core to the virtual machine 240 to run the at least one process.

In operation 613 (or operation 515 of FIG. 5), the host scheduler 223, upon identifying that the at least one selected process is a virtual process, may transmit allocation information for the at least one selected process to the virtual machine 240 which is to run the selected process. The virtual machine 240 may identify the at least one selected process based on the allocation information received from the host OS 220, change the identified process to the running state, and wait for running. In operation 615, the host scheduler 223 may insert the process information for the selected process into the run queue (e.g., the run queue 307a or 307b of FIG. 3B) corresponding to the allocated core. According to an embodiment, operation 615 may be performed before or simultaneously with operation 613.

In operation 617, the virtual machine 240 may run the selected process using the allocated core.

Figure 7:
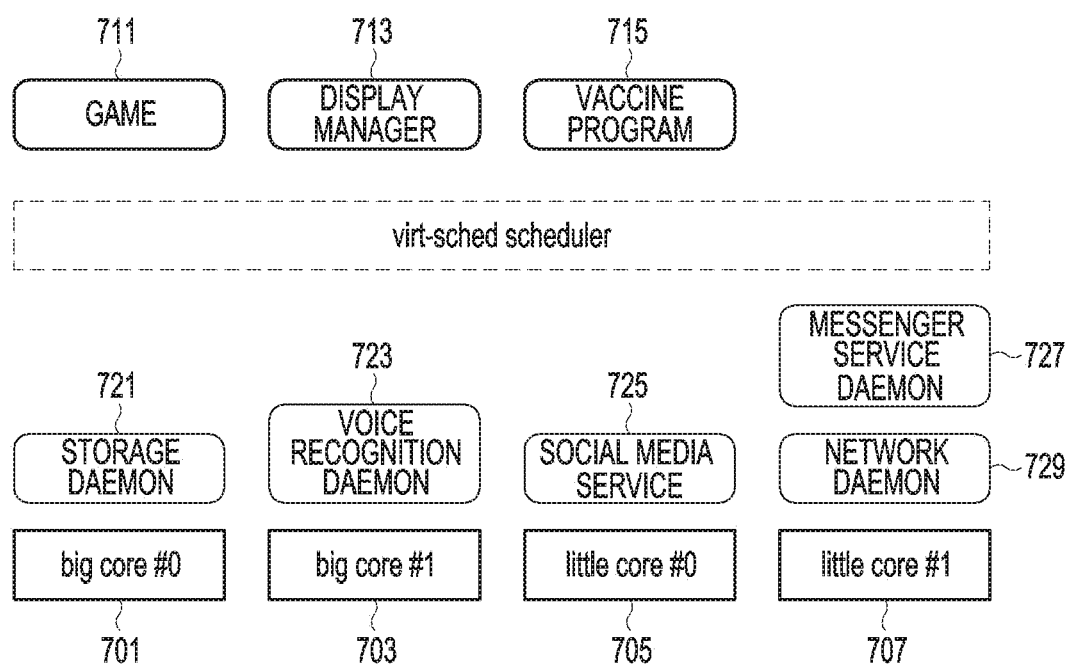
FIG. 7 is a view illustrating an example of process scheduling of an electronic device according to an embodiment of the disclosure.

FIG. 7 is a view illustrating an example of process scheduling of an electronic device according to an embodiment of the disclosure.

Figure 8:
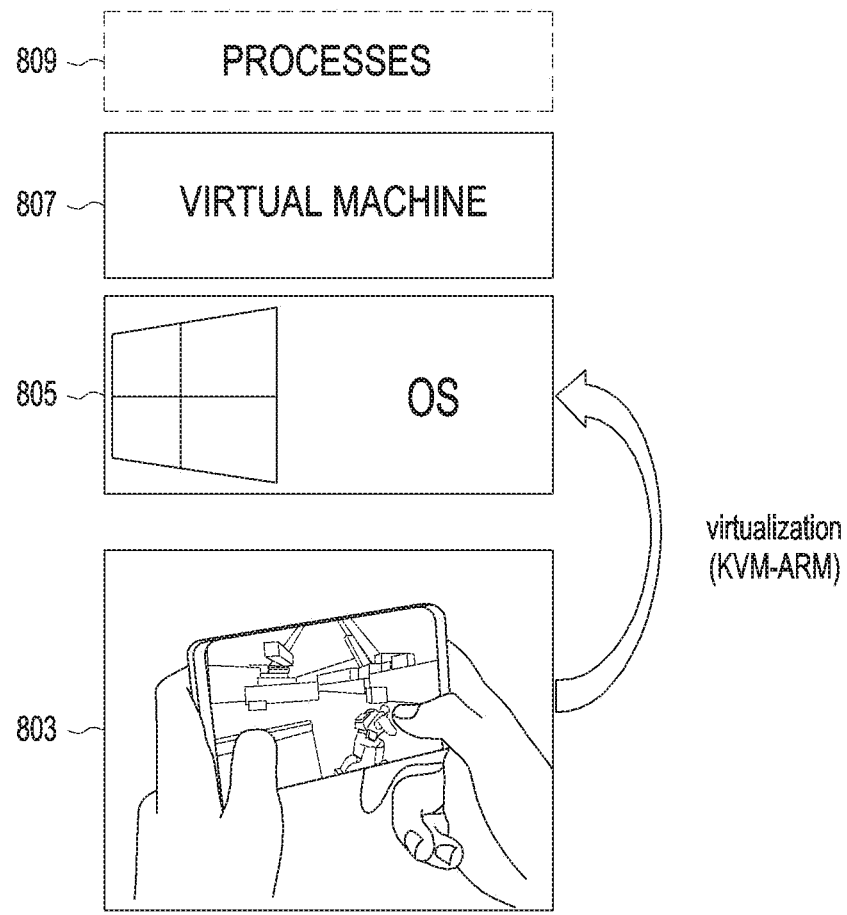
FIG. 8 is a view illustrating an example of process scheduling of an electronic device according to an embodiment of the disclosure.
Figure 8:
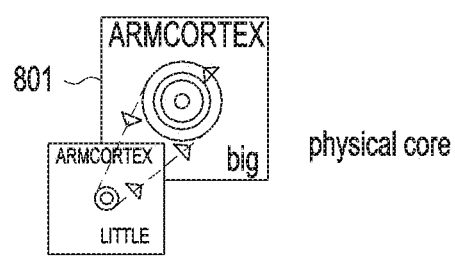

FIG. 8 is a view illustrating an example of process scheduling of an electronic device according to an embodiment of the disclosure.

Referring to FIG. 7, according to an embodiment, four physical cores (e.g., big core #0, big core #1, little core #0, and little core #1) among cores (e.g., the core 123 of FIG. 1) included in at least one processor (e.g., the processor 121 of FIG. 1 or the processor 211 of FIG. 2) are described as an example. The embodiment of FIG. 7 is described based on FIG. 3B.

Referring to FIG. 7, the host OS may select a first virtual process (e.g., a game) 711, a second virtual process (e.g., a display manager 713), and a third virtual process (e.g., a vaccine program) 715 via process scheduling as in operation 609, based on the process information inserted into the virtual ready queue 303 of FIG. 3B. The three selected virtual processes 711, 713, and 715 all may correspond to a single virtual machine, or at least some of the virtual processes 711, 713, and 715 may correspond to different virtual machines. Described below in connection with FIG. 7 is an example in which the three selected virtual processes 711, 713, and 715 all correspond to a single virtual machine. In response to selection of the processes 711, 713, and 715, the host OS may allocate each of the selected virtual processes 711, 713, and 715 based on the process information for each of the selected virtual processes 711, 713, and

715. For example, the host OS may allocate the first virtual process 711 to a first core (big core #0) 701, the second virtual process 713 to a second core (big core #1) 703, and the third virtual process 715 to a third core (little core #0) 705. The second virtual process 713 and the third virtual process 715 may be processes executed while interworking with the first virtual process 711. The process information for each the first to third virtual processes 711, 713, and 715 allocated may be inserted into the run queue corresponding to each of the first core 701, the second core 703, and the third core 705.

The host OS may select host processes to be allocated to the first core to the fourth core based on the process information inserted into the host ready queue 305 as shown in FIG. 3B. For example, the host OS may allocate a first host process (e.g., storage daemon) 721 to the first core 701, a second host process (e.g., a voice recognition service) 723 to the second core 703, and a third host process (e.g., a social media service) 725 to the third core 705. The host OS may allocate a fourth host process (e.g., messenger service daemon) 727 and a fifth host process (e.g., network daemon) 729 to the fourth core (little core #1) 707. At least some of the host processes 721, 723, 725, 727, and 729 may be processes that run in relation to the selected virtual processes 711, 713, and 715.

Referring to FIGS. 7 and 8, the electronic device (e.g., the first electronic device 101 of FIG. 1 or the electronic device 101 of FIG. 2) may include at least one processor (e.g., the processor 123 of FIG. 1 and the processor 211 of FIG. 2) including cores 801. For example, the cores 801 may be physical asymmetric multiple cores with different performances, and each core 801 may be classified as a big core or a little core depending on performance, but not limited thereto. The electronic device may virtualize and run an application 803 which is to run.

The virtual machine 807 running on the electronic device may identify at least one process 809 related to the application 803 and transmit process information for the at least one identified process to the OS (e.g., the host OS) 805 for sharing.

The OS 805 may select at least one process 809 based on the shared process information and allocate the at least one selected process 809 to at least one of the cores 801. For example, the cores 801 may be the first to fourth cores 701, 703, 705, and 707 of FIG. 7, and the at least one selected process 809 may be the first virtual processes 711, 713, and 715, and second host processes 721, 723, 725, 727, and 729 of FIG. 7.

The virtual machine 807 running on the electronic device may run the selected processes 809 based on the allocation information received from the OS 805.

Figure 9:
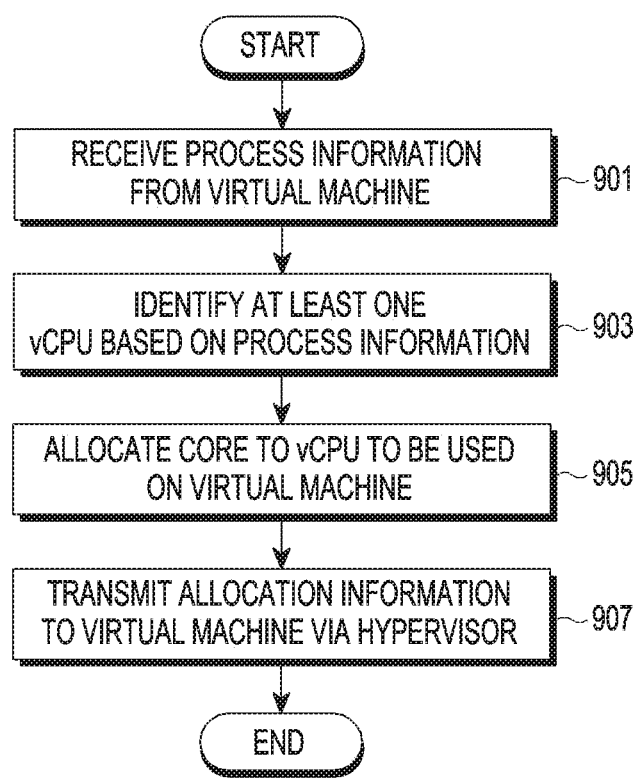
FIG. 9 is a flowchart illustrating operations of an electronic device according to an embodiment of the disclosure.

FIG. 9 is a flowchart illustrating operations of an electronic device according to an embodiment of the disclosure.

Referring to FIG. 9, according to an embodiment, an electronic device (e.g., the first electronic device 101 of FIG. 1 or the electronic device 101 of FIG. 2) may execute at least one virtual machine (e.g., the virtual machine 240 of FIG. 2), a hypervisor (e.g., the hypervisor 230 of FIG. 2), and a host OS (e.g., the host OS 220 of FIG. 2 or 3A) by at least one processor (e.g., the processor 121 of FIG. 1 or the processor 211 of FIG. 2). The host OS may share process information (referred to as process information) for at least one process running on the virtual machine and manage the process information.

Referring to FIG. 9, in operation 901, the host OS running on the electronic device may receive information for the at least one process corresponding to the virtual machine from the virtual machine through the hypervisor.

In operation 903, the host OS may manage the process information received from the virtual machine and identify virtual resources (e.g., vCPU) available to the virtual machine based on the received process information. For example, the host OS may identify the virtual resources based on the number of virtual resources to be allocated to the virtual machine and virtual resource capability (e.g., big virtual resource or little virtual resource).

In operation 905, the host OS may allocate at least one core to at least one virtual resource which is to be used for the virtual machine. In operation 907, the host OS may provide information related to allocation of the at least one core (hereinafter, allocation information) via the hypervisor to the virtual machine.

Upon obtaining the allocation information in operation 907, the hypervisor may reallocate at least one virtual resource available to the virtual machine based on the obtained allocation information. The hypervisor may provide information related to reallocation (also referred to as virtual resource reallocation information) to the virtual machine. Upon obtaining the allocation information, the virtual machine may identify at least one virtual resource allocated thereto based on the allocation information. The virtual machine may select at least one process to run, allocate the at least one identified virtual resource to the at least one selected process, and run the at least one process via the allocated virtual resource.

Figure 10:
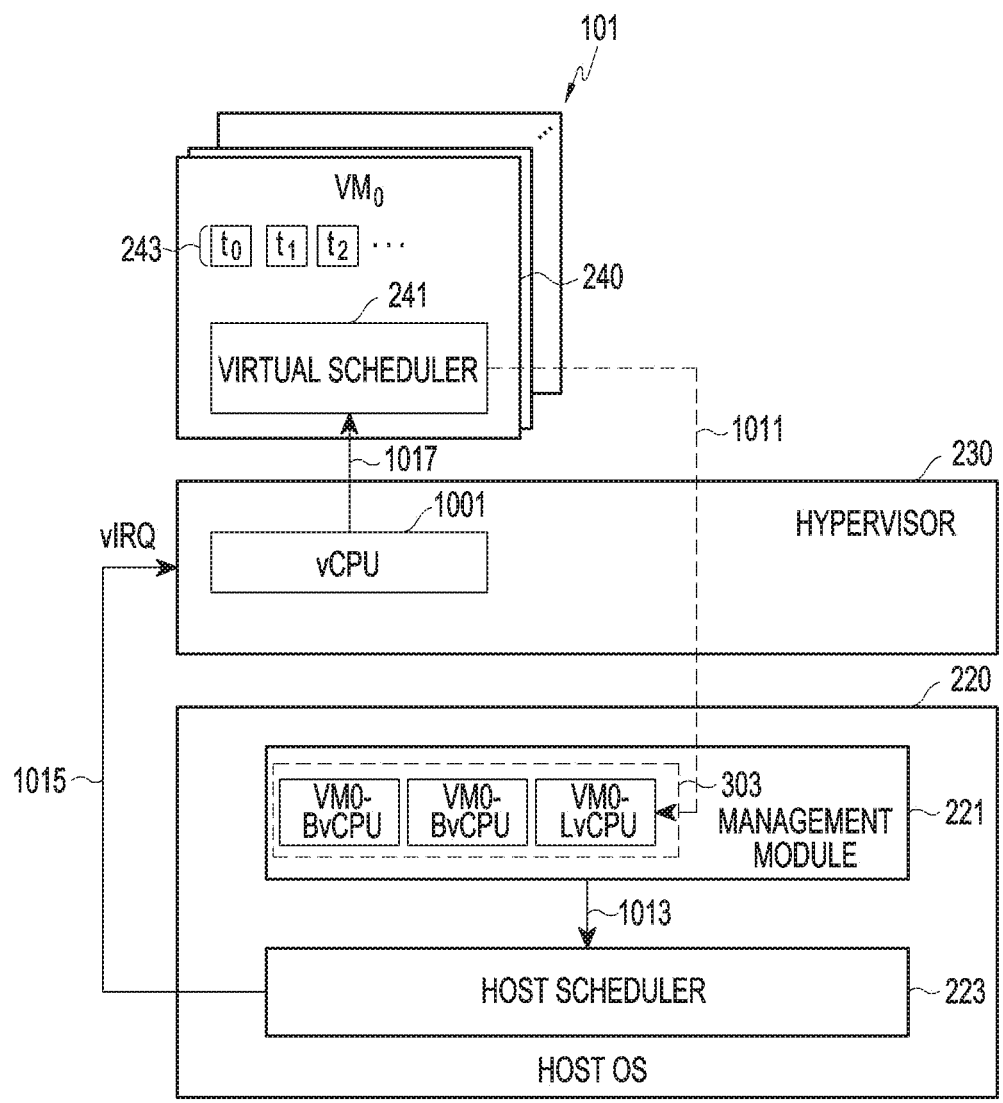
FIG. 10 is a view illustrating operations of an electronic device according to an embodiment of the disclosure.

FIG. 10 is a view illustrating operations of an electronic device according to an embodiment of the disclosure.

Figure 11:
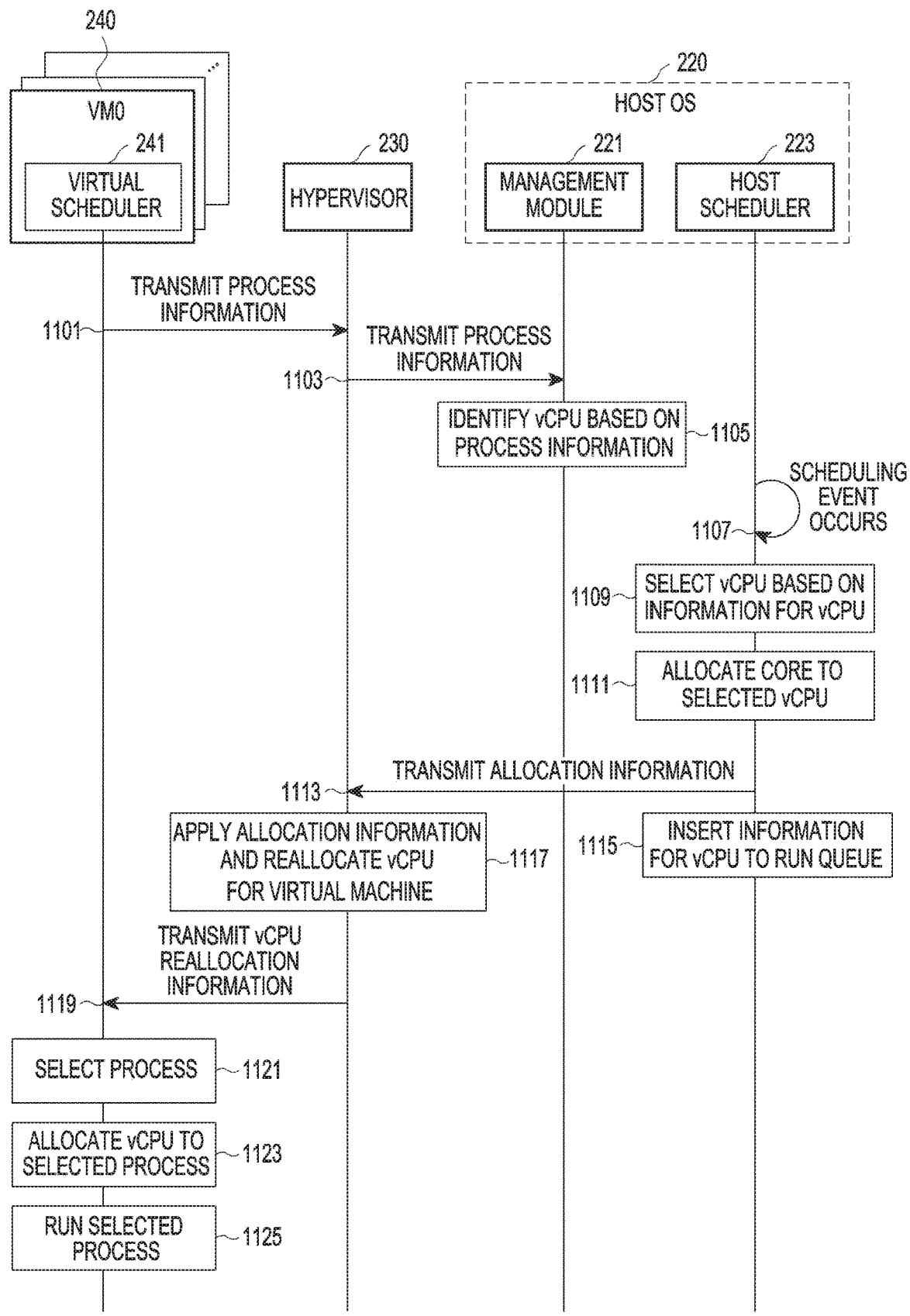
FIG. 11 is a flowchart illustrating operations of an electronic device according to an embodiment of the disclosure.

FIG. 11 is a flowchart illustrating operations of an electronic device according to an embodiment of the disclosure.

Referring to FIGS. 10 and 11, specific operations are described below and based on the scheduling operation of FIG. 9.

Referring to FIGS. 10 and 11, in operations 1101 and 1103 (identical to operation 1011 of FIG. 10), according to an embodiment, at least one virtual machine 240 executed on an electronic device (e.g., the first electronic device 101 of FIG. 1 or the electronic device 101 of FIG. 2), when a new process is generated, may provide process information for the new process via the virtual scheduler 241 to the management module 221 of the host OS 220. In this case, the process information may be provided to the management module 221 via the communication queue of the hypervisor 230, but not limited thereto. According to an embodiment, upon identifying generation of a new process, in a predetermined time period, or whenever scheduling begins, the first virtual scheduler 241 of the virtual machine 240 may provide process information for the new process or process information for the process not shared with the host OS 220 to the hypervisor 230.

In operation 1105, the management module 221 of the host OS 220 may manage the process information provided via the hypervisor. The host OS 220 may identify the virtual resource (e.g., vCPU) available to the virtual machine based on the process information. The management module 221 may insert information for the identified virtual resource into the virtual ready queue 303. The management module 221 may identify order of priority per virtual machine 240 based on the information for the virtual resource. The management module 221 may wait for next scheduling based on the identified order of priority.

In operation 1107, the host scheduler 223 of the host OS 220 may identify an occurrence of a scheduling event.

In operations 1109 and 1111 (or operation 1013 of FIG. 10), if a scheduling event occurs, the host scheduler 223 of the host OS 220 may perform scheduling on the virtual resource. In operation 1109, upon performing scheduling, the host scheduler 223 may select at least one virtual resource available to the virtual machine according to the order of priority identified based on the information for the virtual resource inserted into the virtual ready queue 303. In operation 1111, the host scheduler 223 may allocate at least one core to the at least one selected virtual resource.

In operation 1113 (or operation 1015 of FIG. 10), the host scheduler 223 may provide allocation information for the at least one selected virtual resource to the hypervisor 230. The allocation information may include information for the at least one selected virtual resource and information related to a request for execution.

In operation 1115, the host scheduler 223 may insert the information for the selected virtual resource into the run queue corresponding to the allocated core.

In operation 1117, the hypervisor 230 may reallocate the virtual resource (vCPU) 1001 available to the virtual machine 240 based on the provided allocation information. If the allocation information includes information for virtual resources of multiple virtual machines 240, the hypervisor 230 may reallocate the virtual resource per virtual machine 240 identified based on the allocation information.

In operation 1119 (identical to operation 1017 of FIG. 10), the hypervisor 230 may provide information (hereinafter referred to as virtual resource (vCPU) reallocation information) related to reallocation of virtual resources to the virtual machine 240.

In operations 1121 and 1123, the virtual machine 240 may perform process scheduling based on the virtual resource reallocation information. In operation 1121, the virtual machine 240 may identify at least one virtual resource allocated thereto based on the virtual resource reallocation information and select at least one process to be allocated to the at least one identified virtual resource. In operation 1123, the virtual machine 240, upon performing process scheduling, may allocate at least one virtual resource, which has been allocated thereto, to the selected process.

In operation 1125, the virtual machine 240 may run the selected process using the virtual resource allocated to the selected process.

Figure 12:
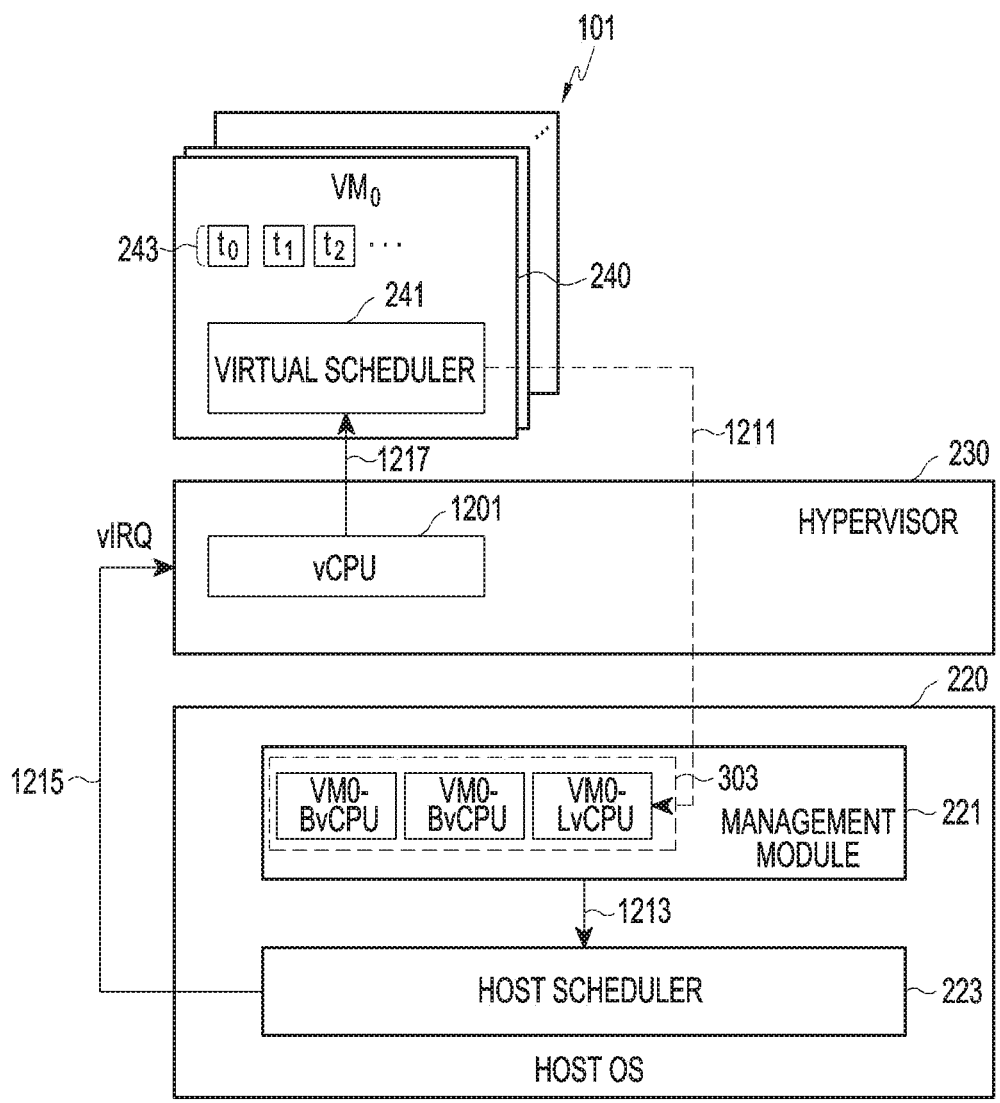
FIG. 12 is a view illustrating operations of an electronic device according to an embodiment of the disclosure.

FIG. 12 is a view illustrating operations of an electronic device according to an embodiment of the disclosure.

Referring to FIG. 12, among the operations, operation 1211 in which the virtual machine 240 periodically provides process information differs from operation 1011 of FIG. 10, and the other operations, e.g., operations 1213, 1215, and 1217 are identical to operations 1013, 1015, and 1017, respectively, of FIG. 10, and thus, no detailed description thereof is given below. In operation 1217, the hypervisor 230 may provide reallocation information for the virtual resource (vCPU) 1201 available to the virtual machine 240 to the virtual machine 240. By the operations of FIG. 12, the electronic device may reduce overhead due to communication between the virtual machine 240 and host OS 220 for scheduling.

Referring to FIG. 12, according to an embodiment, in the electronic device, the host OS may extend the predesignated period, thereby dynamically and intermittently allocating the virtual resources based on history information (e.g., internal history or long-term history), rather than reallocating virtual resources every scheduling time.

According to an embodiment, the operations of FIGS. 10 and 12 may designate the priority and load for each virtual resource based on the process information of the virtual machine. The host scheduler may identify the core capability or performance (e.g., big core or little core) of at least one processor for allocating virtual resources available to the virtual machine and whether to schedule the virtual machine based on the designated priority and load even without directly scheduling the processes of the virtual machine. According to an embodiment, the operations of FIGS. 10 and 12 may reduce overhead due to host scheduling and overhead to the virtual scheduler and management module.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 121 of FIG. 1 or the processor 211 of FIG. 2), may enable the processor to carry out a corresponding function. The computer-readable storage medium may be e.g., a memory (e.g., the memory 130 of FIG. 1).

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out various embodiments of the disclosure, and vice versa.

According to an embodiment, there is provided a computer readable recording medium recording a program running on a computer, the program including executable instructions configured to, when executed by a processor, enable the processor to execute a host OS and at least one virtual machine, the executable instructions enabling the host OS to receive information for at least one process from the virtual machine, allocate at least one core to the virtual machine based on the information for the at least one process, and provide, to the virtual machine, information related to allocation of the at least one core.

According to an embodiment, there is provided a non-transitory computer readable recording medium recording a program running on a computer, the program including executable instructions configured to, when executed by a processor, enable the processor to execute a host OS and at least one virtual machine, the executable instructions enabling the host OS to receive information for at least one process from the virtual machine, allocate at least one core to at least one virtual resource identified based on the information for the at least one process, and provide, to the virtual machine, information related to allocation of the at least one core.

As is apparent from the foregoing description, according to an embodiment, the processor of the virtual machine may be shared and managed by the host OS in the electronic device, storage medium, and method for process scheduling. In the electronic device, storage medium, and method for process scheduling, the host OS may efficiently allocate the processor corresponding to the virtual machine to asymmetric multiple cores, take more advantage of the asymmetric multiple cores, and save space and costs for device hardware.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a memory; and
   at least one asymmetric multi-core processor including multiple cores with different properties,
   wherein the memory stores instructions which, when executed by the at least one asymmetric multi-core processor, cause the at least one asymmetric multi-core processor to execute a host operating system (OS), a hypervisor, and at least one virtual machine,
   wherein the host OS comprises a host scheduler, a host ready queue including information for at least one host process to be run on the host OS, and a virtual ready queue,
   wherein the host OS is configured to:
      receive, via a communication queue of the hypervisor from the at least one virtual machine, information for at least one virtual process to be run on the at least one virtual machine and information related to a scheduling policy, wherein the information for at least one virtual process is managed by a virtual scheduler of the at least one virtual machine,
      insert, into the virtual ready queue, the information for the at least one virtual process to be run on the at least one virtual machine,
      based on the information for at least one virtual process, the information related to the scheduling policy, and the information for the at least one host process, allocate, by the host scheduler, at least one core of the multiple cores to the at least one virtual machine using host scheduling and insert, by the host scheduler, the information for the at least one virtual process into at least one run queue of the host OS, wherein the at least one run queue corresponds to the allocated at least one core, and
      provide, to the at least one virtual machine, allocation information of the allocated at least one core, and
   wherein the at least one virtual machine is configured to:
      based on the allocation information received from the host OS, identify the at least one core allocated by the host scheduler of the host OS, and
      run, by the virtual scheduler of the at least one virtual machine, the at least one virtual process using the identified at least one core.

2. The electronic device of claim 1, wherein the host OS comprises:
   a management module configured to:
      receive the information for the at least one virtual process shared by the virtual scheduler of the at least one virtual machine, and
      manage the information for the at least one virtual process; and
   the host scheduler configured to:
      based on the information for the at least one virtual process, select the at least one virtual process to be run on the at least one virtual machine, and
      perform scheduling to allocate the at least one core to the at least one virtual machine to run the selected at least one virtual process.

3. The electronic device of claim 2,
   wherein the management module is further configured to:
      receive the information related to the scheduling policy shared by the at least one virtual machine, and
      manage the information related to the scheduling policy, and wherein the information related to the scheduling policy includes an order of priority and a virtual runtime indicating a time during which a process is run.

4. The electronic device of claim 2, wherein the host scheduler is further configured to, in response to an occurrence of an event for scheduling, select the at least one host process to be run on the host OS or the at least one virtual process to be run on the at least one virtual machine.

5. The electronic device of claim 4, wherein the host scheduler is further configured to:
   in response to the occurrence of the event for scheduling, select the at least one virtual process to be run on the at least one virtual machine, and
   select the at least one host process to be run on the host OS while interworking with the selected at least one virtual process.

6. The electronic device of claim 1, wherein the host OS is further configured to:
   identify at least one virtual resource available on the at least one virtual machine based on the information for the at least one virtual process, and
   perform scheduling to allocate the at least one core to the at least one virtual resource based on the information for the at least one virtual process.

7. The electronic device of claim 6,
   wherein the host OS is further configured to provide, to the hypervisor of the electronic device, the allocation information of the allocated at least one core,
   wherein the at least one virtual machine is configured to:
      receive, from the hypervisor, at least one virtual resource reallocated by the hypervisor,
      select one or more virtual processes,
      allocate, to the selected one or more virtual processes, the received at least one virtual resource, and
      run the selected one or more virtual processes, and
   wherein the hypervisor reallocates the at least one virtual resource to the at least one virtual machine based on the allocation information received from the host OS.

8. A non-transitory computer readable recording medium recording a program running on a computer, the program including instructions which, when executed by an asymmetric multi-core processor of an electronic device of an asymmetric multi-core including multiple cores with different properties, cause the electronic device to execute a host operating system (OS), a hypervisor, and at least one virtual machine, the executable instructions enabling the host OS to:
   receive, via a communication queue of the hypervisor from the at least one virtual machine, information for at least one virtual process to be run on the at least one virtual machine and information related to a scheduling policy, wherein the information for at least one virtual process is managed by a virtual scheduler of the at least one virtual machine, wherein the host OS comprises a host scheduler, a host ready queue including information for at least one host process to be run on the host OS, and a virtual ready queue, insert, into the virtual ready queue, the information for the at least one virtual process to be run on the at least one virtual machine, based on the information for at least one virtual process, the information related to the scheduling policy, and the information for the at least one host process, allocate, by the host scheduler, at least one core of the multiple cores to the at least one virtual machine using host scheduling and insert, by the host scheduler, the information for the at least one virtual process into at least one run queue of the host OS, wherein the at least one run queue corresponds to the allocated at least one core, and provide, to the at least one virtual machine, allocation information of the allocated at least one core, wherein the executable instructions enable the at least one virtual machine to:

based on the allocation information received from the host OS, identify the at least one core allocated by the host scheduler of the host OS, and run, by the virtual scheduler of the at least one virtual machine, the at least one virtual process using the identified at least one core.

9. The non-transitory computer readable recording medium of claim 8, wherein the allocating of the at least one core to the at least one virtual machine further comprises selecting the at least one host process to be run on the host OS while interworking with the at least one virtual process to be run on the at least one virtual machine.

10. The non-transitory computer readable recording medium of claim 8, wherein the allocating of the at least one core to the at least one virtual machine comprises, in response to an occurrence of an event for scheduling, selecting at least one of the at least one host process run on the host OS or the at least one virtual process to be run on the at least one virtual machine.

11. A method for process scheduling on an electronic device, the method comprising:

receiving, by a communication queue of a host operating system (OS) being executed by at least one asymmetric multi-core processor of the electronic device, information for at least one virtual process to be run on at least one virtual machine via a hypervisor of the electronic device from the at least one virtual machine executed by the at least one asymmetric multi-core processor and information related to a scheduling policy including a virtual runtime of the at least one virtual machine, wherein the information for at least one virtual process is managed by a virtual scheduler of the at least one virtual machine, and wherein the at least one asymmetric multi-core processor includes multiple cores with different properties, wherein the host OS comprises a host scheduler, a host ready queue including information for at least one host process to be run on the host OS, and a virtual ready queue;

inserting, into the virtual ready queue by the host OS, the information for the at least one virtual process to be run on the at least one virtual machine;

based on the information for at least one virtual process, the information related to the scheduling policy, and the information for the at least one host process, allocating, by a-the host scheduler of the host OS, at least one core of the multiple cores to the at least one virtual machine using host scheduling and inserting, by the host scheduler, the information for the at least one virtual process into at least one run queue of the host OS, wherein the at least one run queue corresponds to the allocated at least one core;

providing, by the host OS to the at least one virtual machine, allocation information of the allocated at least one core;

based on the allocation information received from the host OS, identifying, by the at least one virtual machine, the at least one core allocated by the host scheduler of the host OS; and running, by the virtual scheduler of the at least one virtual machine, the at least one virtual process using the identified at least one core.

12. The method of claim 11, wherein the allocating of the at least one core to the at least one virtual machine further comprises selecting the at least one host process to be run on the host OS while interworking with the at least one virtual process to be run on the at least one virtual machine.

13. The method of claim 11, wherein the allocating of the at least one core to the at least one virtual machine comprises, in response to an occurrence of an event for scheduling, selecting at least one of the at least one host process run on the host OS or the at least one virtual process to be run on the at least one virtual machine.

* * * * *